United States Patent
Greco et al.

(10) Patent No.: US 9,493,589 B1
(45) Date of Patent: Nov. 15, 2016

(54) POLYMERS WITH IMPROVED ESCR FOR BLOW MOLDING APPLICATIONS

(71) Applicant: Chevron Phillips Chemical Company LP, The Woodlands, TX (US)

(72) Inventors: Jeff F Greco, Tulsa, OK (US); Qing Yang, Bartlesville, OK (US); Vivek Rohatgi, Owasso, OK (US); Mark L. Hlavinka, Tulsa, OK (US); Jim B Askew, Barnsdall, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/848,395

(22) Filed: Sep. 9, 2015

(51) Int. Cl.
*C08F 210/16* (2006.01)
*C08F 210/14* (2006.01)
*C08F 210/08* (2006.01)

(52) U.S. Cl.
CPC ........... *C08F 210/14* (2013.01); *C08F 210/08* (2013.01); *C08F 210/16* (2013.01); *C08F 2500/05* (2013.01); *C08F 2500/12* (2013.01); *C08F 2500/13* (2013.01); *C08L 2203/10* (2013.01)

(58) Field of Classification Search
CPC .............. C08F 210/16; C08F 2500/05; C08F 2500/07; C08F 2500/12; C08F 2500/13; C08F 2500/17; C08F 500/26
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,501,885 A | 2/1985 | Sherk et al. |
| 4,588,790 A | 5/1986 | Jenking, III et al. |
| 4,794,096 A | 12/1988 | Ewen |
| 4,808,561 A | 2/1989 | Welborn, Jr. |
| 5,310,834 A | 5/1994 | Katzen et al. |
| 5,350,818 A | 9/1994 | Malpass, Jr. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |
| 6,548,442 B1 | 4/2003 | McDaniel et al. |
| 6,576,583 B1 | 6/2003 | McDaniel et al. |
| 6,613,712 B1 | 9/2003 | McDaniel et al. |
| 6,632,894 B1 | 10/2003 | McDaniel et al. |
| 6,667,274 B1 | 12/2003 | Hawley et al. |
| 6,750,302 B1 | 6/2004 | McDaniel et al. |
| 6,787,608 B2 | 9/2004 | VanDun et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,199,073 B2 | 4/2007 | Martin |
| 7,226,886 B2 | 6/2007 | Jayaratne et al. |
| 7,294,599 B2 | 11/2007 | Jensen et al. |
| 7,300,983 B2 | 11/2007 | Degroot et al. |
| 7,312,283 B2 | 12/2007 | Martin et al. |
| 7,517,939 B2 | 4/2009 | Yang et al. |
| 7,601,665 B2 | 10/2009 | McDaniel et al. |
| 7,619,047 B2 | 11/2009 | Yang et al. |
| 7,858,702 B2 | 12/2010 | Jaker |
| 7,884,163 B2 | 2/2011 | McDaniel et al. |
| 7,919,639 B2 | 4/2011 | Murray et al. |
| 8,080,681 B2 | 12/2011 | Murray et al. |
| 8,114,946 B2 | 2/2012 | Yang et al. |
| 8,138,113 B2 | 3/2012 | Yang et al. |
| 8,202,940 B2 | 6/2012 | Jaker et al. |
| 8,309,485 B2 | 11/2012 | Yang et al. |
| 8,318,883 B1 * | 11/2012 | Yang .................... C08F 210/16 502/113 |
| 8,383,730 B2 | 2/2013 | Jaker et al. |
| 8,383,754 B2 | 2/2013 | Yang et al. |
| 8,623,973 B1 | 1/2014 | McDaniel et al. |
| 8,691,715 B2 | 4/2014 | Yang et al. |
| 8,912,285 B2 | 12/2014 | Yang et al. |
| 9,006,367 B2 | 4/2015 | McDaniel et al. |
| 9,156,970 B2 | 10/2015 | Hlavinka et al. |
| 9,169,337 B2 | 10/2015 | Rohatgi et al. |

(Continued)

FOREIGN PATENT DOCUMENTS

WO    WO 2009/085922 A1 *  7/2009  ................ C08F 4/00

OTHER PUBLICATIONS

Modern Plastics Encyclopedia, Mid-Nov. 1995 Issue, vol. 72, No. 12, 3 pages.

(Continued)

*Primary Examiner* — Rip A Lee
(74) *Attorney, Agent, or Firm* — Merchant & Gould P.C.

(57) ABSTRACT

Disclosed herein are ethylene-based polymers generally characterized by a density greater than 0.954 g/cm$^3$, high load melt index ranging from 10 to 45 g/10 min, a ratio of high load melt index to melt index ranging from 175 to 600, a rheological slope parameter ranging from 0.15 to 0.30, and an ESCR in 10% igepal exceeding 800 hours. These polymers have the beneficial processability and die swell features of chromium-based resins, but with improved stiffness and stress crack resistance, and can be used in blow molding and other end-use applications.

22 Claims, 1 Drawing Sheet

(56) References Cited

U.S. PATENT DOCUMENTS

| | | | |
|---|---|---|---|
| 9,175,111 B2* | 11/2015 | Kapur | C08F 10/00 |
| 9,181,370 B2 | 11/2015 | Sukhadia et al. | |
| 9,181,372 B2 | 11/2015 | Yang et al. | |
| 9,273,170 B2 | 3/2016 | Hlavinka et al. | |
| 2004/0059070 A1 | 3/2004 | Whitte | |
| 2006/0235171 A1 | 10/2006 | Lee et al. | |
| 2014/0004285 A1 | 1/2014 | Boissiere et al. | |
| 2014/0342141 A1 | 11/2014 | Cui et al. | |
| 2015/0065669 A1 | 3/2015 | Hlavinka et al. | |
| 2015/0259444 A1* | 9/2015 | Rohatgi | C08F 10/14 526/348.5 |
| 2015/0259455 A1 | 9/2015 | Hlavinka et al. | |
| 2016/0053035 A1 | 2/2016 | Rohatgi et al. | |

OTHER PUBLICATIONS

Film Extrusion Manual—Process, Materials, Properties, TAPPI Press, 1992, 16 pages.
Hieber et al., "Some correlations involving the shear viscosity of polystyrene melts," Rheologica Acta, 1989, vol. 28, pp. 321-332.
Hieber et al., "Shear-Rate-Dependence Modeling of Polymer Melt Viscosity," Polymer Engineering and Science, 1992, 32(14), pp. 931-938.
Bird et al., "Dynamics of Polymeric Liquids," vol. 1, Fluid Mechanics, 2nd Edition, John Wiley & Sons, 1987, 3 pages.
Janzen et al., "Diagnosing long-chain branching in polyethylenes," Journal of Molecular Structure, 1999, 485-486, pp. 569-584.
Wyatt, "Light scattering and the absolute characterization of macromolecules," Wyatt Technology Corporation, Analytica Chimica Acta, 272, 1993, pp. 1-40.
Arnett et al., "Zero-Shear Viscosity of Some Ethyl Branched Paraffinic Model Polymers," Journal of Physical Chemistry, 1980, 84(6), pp. 649-652.
Yu, et al. entitled "Long Chain Branches in Metallocene-Catalyzed Polyethylene Determined by a Combination of SEC/Multi-Angle Light Scattering, NMR and Rheology," published in *Polymer Preprints* 2003, vol. 44 (2), pp. 49-50.
Article entitled "SABIC Expands Product Portfolio by Adding Bimodal HDPE Blow Molding Grades for Bottles," published Mar. 5, 2013, 1 page.
Kapur, Mridula (Babli), article entitled "Next Generation HDPE for Blow Molding Applications," published in ANTEC 2009, pp. 65-69.
Marlex® HXB TR-512 Data Sheet, May 2007, 1 page.
Marlex® HXM 50100 Data Sheet, May 2007, 1 page.
U.S. Appl. No. 14/848,405, filed Sep. 9, 2015 entitled "Methods for Controlling Die Swell in Dual Catalyst Olefin Polymerization Systems".

* cited by examiner

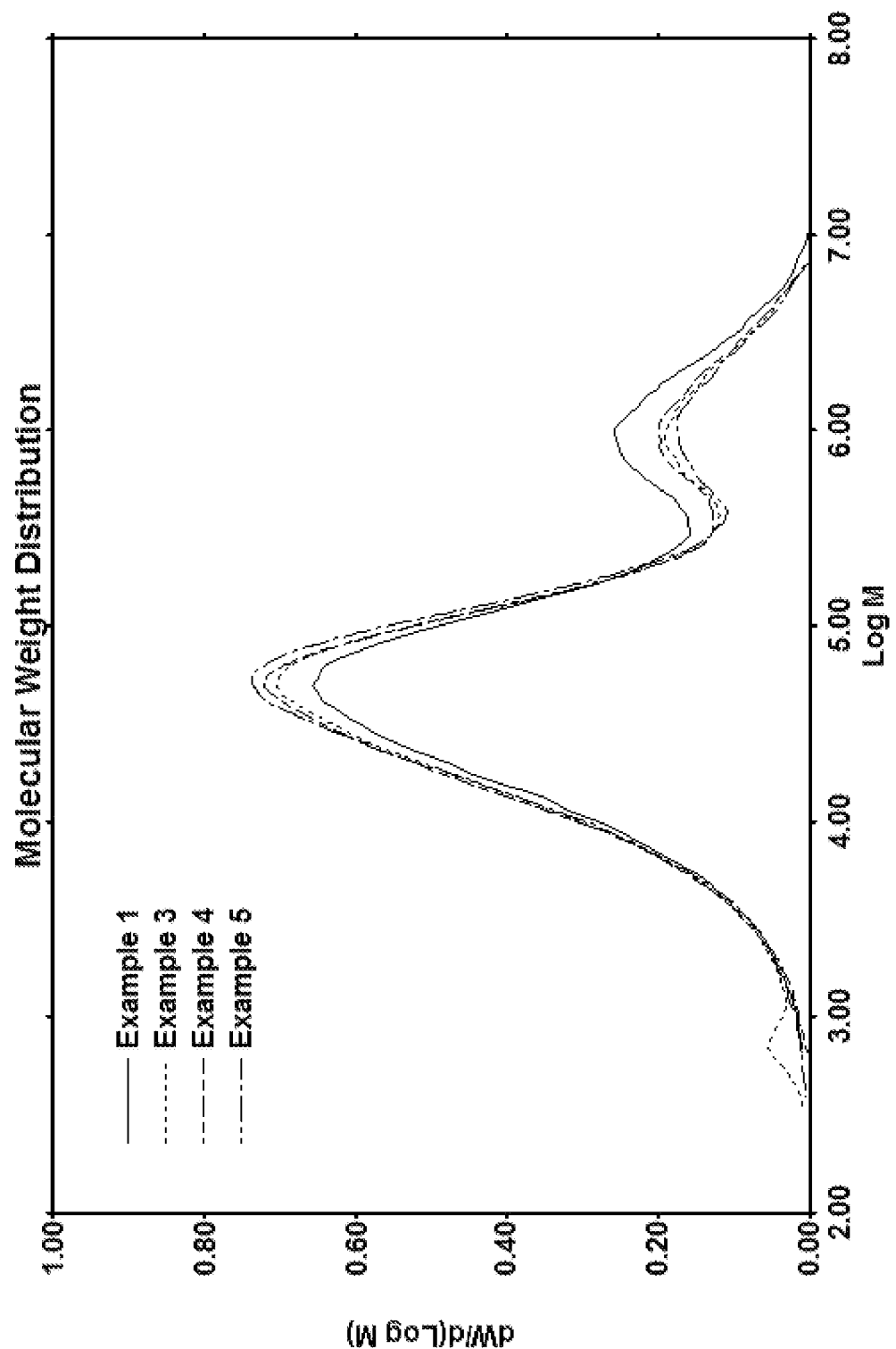

US 9,493,589 B1

POLYMERS WITH IMPROVED ESCR FOR BLOW MOLDING APPLICATIONS

BACKGROUND OF THE INVENTION

Polyolefins such as high density polyethylene (HDPE) homopolymer and copolymer can be produced using various combinations of catalyst systems and polymerization processes. Chromium-based catalyst systems can, for example, produce olefin polymers having good extrusion processibility and polymer melt strength, typically due to their broad molecular weight distribution (MWD).

In some end-use applications, such as blow molding, it can be beneficial to have the processibility, die swell, and melt strength similar to that of an ethylene polymer produced from a chromium-based catalyst system, as well as improvements in toughness, topload strength, and environmental stress crack resistance (ESCR) at equivalent or higher polymer densities. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymers (e.g., ethylene/α-olefin copolymers) characterized by a density of greater than or equal to about 0.954 g/cm$^3$, a high load melt index (HLMI) in a range from about 10 to about 45 g/10 min, a ratio of high load melt index to melt index (HLMI/MI) in a range from about 175 to about 600, a slope of a plot of the viscosity (in Pa-sec) versus shear rate (in sec$^{-1}$) of the ethylene polymer at 100 sec$^{-1}$ in a range from about 0.15 to about 0.30, and an environmental stress crack resistance (ESCR, 10% igepal) of greater than or equal to about 800 hours.

In some aspects, the ethylene polymer can have a density in a range from about 0.954 to about 0.962 g/cm$^3$ (or from about 0.9545 to about 0.962 g/cm$^3$, or from about 0.955 to about 0.960 g/cm$^3$), a HLMI in a range from about 15 to about 40 g/10 min (or from about 15 to about 38 g/10 min, or from about 15 to about 35 g/10 min), a ratio of HLMI/MI in a range from about 190 to about 550 (or from about 200 to about 500, or from about 210 to about 480), a slope of a plot of the viscosity (in Pa-sec) versus shear rate (in sec$^{-1}$) of the ethylene polymer at 100 sec$^{-1}$ in a range from about 0.15 to about 0.28 (or from about 0.16 to about 0.28, or from about 0.17 to about 0.27), and an environmental stress crack resistance (ESCR, 10% igepal) of greater than or equal to about 1000 hours (or greater than or equal to about 1100 hours, or greater than or equal to about 1200 hours).

These polymers, in further aspects, can be characterized by a melt index (MI) in a range from about 0.01 to about 0.5 g/10 min, and/or less than about 0.008 long chain branches (LCB) per 1000 total carbon atoms, and/or a reverse comonomer distribution, and/or a Mw in a range from about 200,000 to about 400,000 g/mol, and/or a Mn in a range from about 10,000 to about 40,000 g/mol, and/or a Mz in a range from about 1,400,000 to about 3,000,000 g/mol, and/or a ratio of Mw/Mn in a range from about 8 to about 25, and/or a ratio of Mz/Mw in a range from about 4.5 to about 8.5, and/or a zero-shear viscosity (using the Carreau-Yasuda model with creep adjustment) in a range from about 1×10$^5$ to about 1×10$^7$ Pa-sec, and/or a viscosity at 100 sec$^{-1}$ in a range from about 800 to about 2000 Pa-sec, and/or a die swell in a range from about 28 to about 43%, and/or a bottle topload strength in a range from about 150 to about 200 pounds, and/or a bimodal molecular weight distribution.

Moreover, these polymers can be can contain a high or higher molecular weight (HMW) component and a low or lower molecular weight (LMW) component and, accordingly, can be further characterized by a HMW component having a Mp in a range from about 800,000 to about 1,200,000 g/mol, and/or a Mw in a range from about 1,000,000 to about 1,500,000 g/mol, and/or a Mn in a range from about 400,000 to about 800,000 g/mol, and/or a ratio of Mz/Mw in a range from about 1.5 to about 2.2, and/or a ratio of Mw/Mn in a from about 1.8 to about 2.7; and a LMW component having a Mp in a from about 40,000 to about 75,000 g/mol, and/or a Mw in a range from about 42,000 to about 80,000 g/mol, and/or a Mn in a range from about 8,000 to about 25,000 g/mol, and/or a ratio of Mz/Mw in a range from about 1.5 to about 2.8, and/or a ratio of Mw/Mn in a range from about 3 to about 6. The amount of the HMW component, based on the total polymer (wt. %), can range from about 10 to about 26%, from about 12 to about 30%, or from about 12 to about 24%.

These ethylene polymers can be used to produce various articles of manufacture, such as films, sheets, pipes, geomembranes, and blow molded bottles. Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

BRIEF DESCRIPTION OF THE FIGURE

FIG. 1 presents a plot of the molecular weight distributions of the polymers of Examples 1 and 3-5.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; catalyst component I, catalyst component II, an activator, and optionally, a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound(s), or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The term "contact product" is used herein to describe compositions wherein the components are contacted together in any order, in any manner, and for any length of time, unless otherwise specified. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical moiety having a certain number of carbon atoms is disclosed or claimed, the intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the ratio of Mw/Mn of an ethylene polymer consistent with aspects of this invention. By a disclosure that the ratio of Mw/Mn can be in a range from about 8 to about 25, the intent is to recite that the ratio of Mw/Mn can be any ratio in the range and, for example, can be equal to about 8, about 9, about 10, about 11, about 12, about 13, about 14, about 15, about 16, about 17, about 18, about 19, about 20, about 21, about 22, about 23, about 24, or about 25. Additionally, the ratio of Mw/Mn can be within any range from about 8 to about 25 (for example, from about 11 to about 21), and this also includes any combination of ranges between about 8 and about 25 (for example, the Mw/Mn ratio can be in a range from about 8 to about 12, or from about 15 to about 20). Likewise, all other ranges disclosed herein should be interpreted in a manner similar to these examples.

DETAILED DESCRIPTION OF THE INVENTION

The present invention is directed generally to higher density ethylene-based polymers having reduced die swell and improved toughness, topload strength, and environmental stress crack resistance (ESCR). Articles produced from these ethylene-based polymers, for example, using film/sheet extrusion, profile extrusion, or blow molding, are suitable for a variety of end-use applications.

Ethylene Polymers

Generally, the polymers disclosed herein are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; or alternatively, the olefin comonomer can comprise a $C_4$-$C_{10}$ α-olefin.

According to another aspect of this invention, the olefin monomer can comprise ethylene, and the olefin comonomer can include, but is not limited to, propylene, 1-butene, 1-pentene, 1-hexene, 1-heptene, 1-octene, and the like, or combinations thereof. In yet another aspect, the comonomer can comprise 1-butene, 1-hexene, 1-octene, or any combination thereof. In still another aspect, the comonomer can comprise 1-butene; alternatively, 1-hexene; or alternatively, 1-octene. Typically, the amount of the comonomer, based on the total weight of monomer (ethylene) and comonomer, can be in a range from about 0.01 to about 10 wt. %, from about 0.1 to about 5 wt. %, from about 0.15 to about 5 wt. %, from about 0.15 to about 2 wt. %, or from about 0.1 to about 1 wt. %.

In some aspects, the ethylene polymer of this invention can be an ethylene/α-olefin copolymer. For example, the ethylene polymer can comprise an ethylene/1-butene copolymer, an ethylene/1-hexene copolymer, or an ethylene/1- octene copolymer. In particular aspects contemplated herein, the ethylene polymer can comprise an ethylene/1-hexene copolymer.

Certain aspects of this invention are directed to improved polyolefin resins for blow molding applications, as compared to conventional resins produced using chromium-based catalyst systems. Conventional chromium-based resins for blow molding applications generally have a broad MWD, acceptable die swell, high melt strength, and overall excellent processability on a wide range of blow molding machinery. Notwithstanding these benefits, improvements in toughness, topload strength, stiffness, and ESCR are desired, while maintaining substantially no melt fracture, substantially no gels that can cause pinholes, substantially no char or black specs, substantially no smoke and odor, and good trimmability. Ethylene polymers described herein, in certain aspects, can provide a unique combination of the ease of processing typically associated with conventional chromium-based resins (e.g., acceptable die swell, high melt strength, etc.), along with improvements in toughness, stiffness (e.g., higher density), topload strength, and ESCR over conventional chromium-based resins. Such improvements can result in blow molded parts or articles with longer lifetimes, and may allow processors the opportunity to downgauge or thin-wall the blow molded parts or articles, resulting in decreased resin usage and cost reduction.

An illustrative and non-limiting example of an ethylene polymer (e.g., an ethylene copolymer) of the present invention can have a density of greater than or equal to about 0.954 g/cm$^3$, a high load melt index (HLMI) in a range from about 10 to about 45 g/10 min, a ratio of high load melt index to melt index (HLMI/MI) in a range from about 175 to about 600, a slope of a plot of the viscosity (in Pa-sec) versus shear rate (in sec$^{-1}$) of the ethylene polymer at 100 sec$^{-1}$ in a range from about 0.15 to about 0.30, and an environmental stress crack resistance (ESCR, 10% igepal) of greater than or equal to about 800 hours.

Another illustrative and non-limiting example of an ethylene polymer of the present invention can have a density in a range from about 0.954 to about 0.962 g/cm$^3$ (or from about 0.9545 to about 0.962 g/cm$^3$, or from about 0.955 to about 0.960 g/cm$^3$), a HLMI in a range from about 15 to about 40 g/10 min (or from about 15 to about 38 g/10 min, or from about 15 to about 35 g/10 min), a ratio of HLMI/MI in a range from about 190 to about 550 (or from about 200 to about 500, or from about 210 to about 480), a slope of a plot of the viscosity (in Pa-sec) versus shear rate (in sec$^{-1}$) of the ethylene polymer at 100 sec$^{-1}$ in a range from about 0.15 to about 0.28 (or from about 0.16 to about 0.28, or from about 0.17 to about 0.27), and an environmental stress crack resistance (ESCR, 10% igepal) of greater than or equal to about 1000 hours (or greater than or equal to about 1100 hours, or greater than or equal to about 1200 hours). These illustrative and non-limiting examples of ethylene polymers consistent with the present invention also can have any of the polymer properties listed below and in any combination.

The densities of ethylene-based polymers disclosed herein often are greater than or equal to about 0.954 g/cm$^3$, for example, greater than or equal to about 0.9545, or greater than or equal to about 0.955 g/cm$^3$, and often can range up to about 0.968 g/cm$^3$. Yet, in particular aspects, the density can be in a range from about 0.954 to about 0.965, from about 0.9545 to about 0.962, from about 0.955 to about 0.965, from about 0.954 to about 0.962, or from about 0.955 to about 0.960 g/cm$^3$.

Consistent with certain aspects of this invention, ethylene polymers described herein can have a relatively low high load melt index (HLMI), often in a range from about 10 to about 45, from about 12 to about 42, from about 15 to about 40, or from about 15 to about 38 g/10 min. In further aspects, ethylene polymers described herein can have a HLMI in a range from about 15 to about 35, from about 16 to about 40, from about 16 to about 38, from about 16 to about 35, or from about 17 to about 38 g/10 min.

Ethylene polymers in accordance with this invention can have a relatively high melt flow ratio, i.e., the ratio of HLMI/MI can fall within a range from about 175 to about 600, from about 190 to about 550, or from about 200 to about 500. Other suitable ranges for HLMI/MI can include, but are not limited to, from about 210 to about 500, from about 210 to about 480, from about 200 to about 480, from about 200 to about 460, or from about 210 to about 460.

Unexpectedly, Applicants determined that the die swell of an ethylene polymer, for example, in a blow molding process, correlates with a rheological slope parameter, i.e., the slope of a plot of the viscosity (Pa-sec) versus shear rate (sec$^{-1}$) at 100 sec$^{-1}$ for the ethylene polymer at 190° C., and that it can be beneficial for this rheological slope parameter to be less than or equal to about 0.30 In an aspect, the ethylene polymer can have a slope of a plot of the viscosity (Pa-sec) versus shear rate (sec$^{-1}$) at 100 sec$^{-1}$ and 190° C. (the rheological slope parameter) in a range from about 0.15 to about 0.30, such as, for example, from about 0.15 to about 0.28, from about 0.15 to about 0.27, from about 0.16 to about 0.30, from about 0.16 to about 0.28, or from about 0.17 to about 0.27. The rheological slope parameter is determined from viscosity data measured at 190° C. and using the Carreau-Yasuda (CY) empirical model as described herein with creep adjustment.

The disclosed ethylene polymers have significantly improved environmental stress crack resistance (ESCR) over comparable polymers (e.g., equivalent density, melt index, molecular weight, etc.) produced using a chromium-based catalyst system. ESCR testing and test results disclosed herein are from ASTM D1693, condition B, with 10% igepal (the 10% igepal ESCR test is a much more stringent test than ESCR testing conducted using a 100% igepal solution). In some aspects, the ethylene polymers described herein can have an ESCR (using 10% igepal) of greater than or equal to about 600 hours, greater than or equal to about 800 hours, or greater than or equal to about 1000 hours. In further aspects, the ethylene polymers described herein can have an ESCR (using 10% igepal) of greater than or equal to about 1100 hours, greater than or equal to about 1200 hours, or greater than or equal to about 1300 hours, and often can range as high as 1500-2500 hours. The ESCR test is typically stopped after a certain number of hours is reached, and given the long duration of the test, the upper limit of ESCR (in hours) is generally not determined.

Ethylene polymers (homopolymers, copolymers, etc.) of this invention generally can have a relatively low melt index (MI), but greater than zero. Melt indices in the range from about 0.01 to about 0.5, from about 0.01 to about 0.25, or from about 0.01 to about 0.2, are contemplated in aspects of this invention. For example, a polymer of the present invention can have a MI in a range from about 0.02 to about 0.25, or from about 0.02 to about 0.2 g/10 min.

Generally, polymers in aspects of the present invention have low levels of long chain branching, with typically less than about 0.01 long chain branches (LCB) per 1000 total carbon atoms, and similar in LCB content to polymers shown, for example, in U.S. Pat. Nos. 7,517,939, 8,114,946, and 8,383,754, which are incorporated herein by reference in their entirety. In other aspects, the number of LCB per 1000 total carbon atoms can be less than about 0.008, less than about 0.007, less than about 0.005, or less than about 0.003 LCB per 1000 total carbon atoms.

Ethylene copolymers described herein can, in some aspects, have a non-conventional (reverse) comonomer distribution, generally, the higher molecular weight portions of the polymer have higher comonomer incorporation than the lower molecular weight portions. Typically, there is an increasing comonomer incorporation with increasing molecular weight. In one aspect, the number of short chain branches (SCB) per 1000 total carbon atoms of the polymer at Mw is greater than the number at Mn. In another aspect, the number of short chain branches (SCB) per 1000 total carbon atoms of the polymer at Mz is greater than the number at Mw. In yet another aspect, the number of SCB per 1000 total carbon atoms of the polymer at Mz is greater than the number at Mn. In still another aspect, the number of short chain branches (SCB) per 1000 total carbon atoms of the polymer at a molecular weight of $10^6$ is greater than the number at a molecular weight of $10^5$.

In an aspect, ethylene polymers described herein can have a ratio of Mw/Mn, or the polydispersity index, in a range from about 8 to about 25, from about 8 to about 22, from about 10 to about 25, or from about 12 to about 25. In another aspect, ethylene polymers described herein can have a Mw/Mn in a range from about 10 to about 22, from about 11 to about 21, or from about 12 to about 21.

In an aspect, ethylene polymers described herein can have a ratio of Mz/Mw in a range from about 4 to about 9, from about 4.5 to about 8.5, from about 5 to about 9, or from about 5 to about 8.5. In another aspect, ethylene polymers described herein can have a Mz/Mw in a range from about 5 to about 8, from about 6 to about 8, or from about 6.5 to about 7.5.

In an aspect, ethylene polymers described herein can have a weight-average molecular weight (Mw) in a range from about 150,000 to about 425,000, from about 200,000 to about 400,000, from about 225,000 to about 400,000, or from about 250,000 to about 400,000 g/mol. In another aspect, ethylene polymers described herein can have a Mw in a range from about 250,000 to about 350,000, from about 240,000 to about 360,000, or from about 240,000 to about 300,000 g/mol.

In an aspect, ethylene polymers described herein can have a number-average molecular weight (Mn) in a range from about 10,000 to about 40,000, from about 10,000 to about 35,000, or from about 10,000 to about 30,000 g/mol. In another aspect, ethylene polymers described herein can have a Mn in a range from about 10,000 to about 20,000, from about 11,000 to about 30,000, or from about 11,000 to about 25,000 g/mol.

In an aspect, ethylene polymers described herein can have a z-average molecular weight (Mz) in a range from about 1,400,000 to about 3,500,000, from about 1,400,000 to about 3,000,000, or from about 1,500,000 to about 3,000,000 g/mol. In another aspect, ethylene polymers described herein can have a Mz in a range from about 1,500,000 to about 2,500,000, from about 1,500,000 to about 2,000,000, from about 1,400,000 to about 2,400,000, or from about 1,600,000 to about 2,200,000 g/mol.

In some aspects, ethylene polymers described herein can have a zero-shear viscosity at 190° C. of greater than or equal to about $1 \times 10^5$, greater than or equal to about $2 \times 10^5$, in a range from about $1 \times 10^5$ to about $1 \times 10^7$, or in a range from about $2 \times 10^5$ to about $1 \times 10^7$ Pa-sec. In these and other aspects, ethylene polymers described herein can have a zero-shear viscosity in a range from about $5 \times 10^5$ to about $5 \times 10^6$, or in a range from about $6 \times 10^5$ to about $2 \times 10^6$ Pa-sec. These viscosities are determined using the Carreau Yasuda model with creep adjustment. While not wishing to be bound by theory, Applicants believe that a higher zero-shear viscosity may correlate with a higher polymer melt strength (e.g., better melt strength and processability in blow molding).

Additionally or alternatively, ethylene polymers described herein can have a viscosity at 100 sec$^{-1}$ (eta @ 100 or η @ 100) at 190° C. in a range from about 800 to about 2000, from about 800 to about 1800, from about 800 to about 1700, from about 900 to about 1800, from about 1000 to about 2000, or from about 1000 to about 1800 Pa-sec. This rheological parameter is determined at 190° C. using the Carreau-Yasuda (CY) empirical model with creep adjustment as described herein.

Generally, ethylene polymers consistent with certain aspects of the invention can have a bimodal molecular weight distribution (as determined using gel permeation chromatography (GPC) or other suitable analytical technique). Often, in a bimodal molecular weight distribution, there is a valley between the peaks, and the peaks can be separated or deconvoluted. Typically, a bimodal molecular weight distribution can be characterized as having an identifiable high or higher molecular weight component (or distribution) and an identifiable low or lower molecular weight component (or distribution). Illustrative unimodal MWD curves and bimodal MWD curves are shown in U.S. Pat. No. 8,383,754, incorporated herein by reference in its entirety.

In an aspect, the ethylene polymer described herein can be a reactor product (e.g., a single reactor product), for example, not a post-reactor blend of two polymers, for instance, having different molecular weight characteristics. As one of skill in the art would readily recognize, physical blends of two different polymer resins can be made, but this necessitates additional processing and complexity not required for a reactor product.

As described herein, ethylene polymers (e.g., ethylene/α-olefin copolymers) can have a low or lower molecular weight (LMW) component and a high or higher molecular weight (HMW) component. These component terms are relative, are used in reference to each other, and are not limited to the actual molecular weights of the respective components. The molecular weight characteristics and relative amounts of these LMW and HMW components are determined by deconvoluting the composite (overall polymer) molecular weight distribution (e.g., determined using gel permeation chromatography). The amount of the HMW component, based on the weight of the total polymer, is not limited to any particular range. Generally, however, the amount of the HMW component can less than or equal to about 30%, less than or equal to about 26%, less than or equal to about 24%, or less than or equal to about 22%. Suitable non-limiting ranges for the amount of the HMW component, based on the weight of the total polymer, include from about 10 to about 26%, from about 10 to about 24%, from about 12 to about 30%, from about 12 to about 26%, from about 12 to about 24%, from about 14 to about 28%, or from about 14 to about 24%.

In accordance with aspects of this invention, the HMW component can have a Mp in a range from about 800,000 to about 1,200,000, from about 850,000 to about 1,100,000, from about 900,000 to about 1,200,000, or from about 900,000 to about 1,100,000 g/mol. Additionally or alternatively, the HMW component can have a relatively high Mw, typically in a range from about 1,000,000 to about 1,500, 000, from about 1,000,000 to about 1,400,000, from about 1,100,000 to about 1,400,000, or from about 1,050,000 to about 1,350,000 g/mol. Additionally or alternatively, the HMW component can have a Mn in a range from about 400,000 to about 800,000, from about 400,000 to about 700,000, from about 450,000 to about 800,000, or from about 450,000 to about 700,000 g/mol. Additionally or alternatively, the HMW component can have a ratio of Mz/Mw of less than or equal to about 2.5, less than or equal to about 2.2, from about 1.5 to about 2.2, or from about 1.5 to about 2. Additionally or alternatively, the HMW component can have a relatively narrow molecular weight distribution, as reflected by a ratio of Mw/Mn of less than or equal to about 3, less than or equal to about 2.5, from about 1.8 to about 2.7, or from about 1.8 to about 2.5.

In accordance with aspects of this invention, the LMW component can have a Mp in a range from about 40,000 to about 75,000, from about 45,000 to about 80,000, from about 45,000 to about 75,000, or from about 45,000 to about 65,000 g/mol. Additionally or alternatively, the LMW component can have a relatively high Mw, typically in a range from about 42,000 to about 80,000, from about 42,000 to about 75,000, from about 50,000 to about 80,000, or from about 50,000 to about 70,000 g/mol. Additionally or alternatively, the LMW component can have a Mn in a range from about 8,000 to about 25,000, from about 10,000 to about 25,000, from about 10,000 to about 20,000, or from about 10,000 to about 18,000 g/mol. Additionally or alternatively, the LMW component can have a relatively small ratio of Mz/Mw, typically less than or equal to about 2.8, from about 1.5 to about 2.8, from about 1.6 to about 2.5, from about 1.6 to about 2.5, from about 1.6 to about 2.4, or from about 1.7 to about 2.3. Additionally or alternatively, the LMW component can have a ratio of Mw/Mn in a range from about 3 to about 6, from about 3.5 to about 5.5, or from about 4 to about 5.

Aspects of this invention also are directed to the performance of the ethylene polymer (e.g., an ethylene/1-hexene copolymer) on representative blow molding equipment, as described hereinbelow. Ethylene polymers disclosed herein can have a surprisingly low die swell, typically falling in a range from about 28 to about 43%, from about 28 to about 40%, from about 30 to about 40%, from about 32 to about 42%, from about 34 to about 42%, or from about 34 to about 40%. The improved strength properties of the disclosed ethylene polymers are reflected in the bottle topload strength. The bottle topload strength often can range from about 150 to about 200, from about 160 to about 200, from about 170 to about 200, from about 170 to about 195, or from about 170 to about 190 pounds.

Articles and Products

Articles of manufacture can be formed from, and/or can comprise, the ethylene polymers of this invention and, accordingly, are encompassed herein. For example, articles which can comprise ethylene polymers of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like.

Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, an article of manufacture can comprise any of ethylene polymers described herein, and the article of manufacture can be a blow molded bottle.

Applicants also contemplate a method for forming or preparing an article of manufacture comprising any ethylene polymer disclosed herein. For instance, a method can comprise (i) contacting a catalyst composition with ethylene and an optional olefin comonomer under polymerization conditions in a polymerization reactor system to produce an ethylene polymer, wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the ethylene polymer. The forming step can comprise blending, melt processing, extruding, molding (e.g., blow molding), or thermoforming, and the like, including combinations thereof.

Catalyst Systems and Polymerization Processes

In accordance with some aspects of the present invention, the ethylene polymer can be produced using a Ziegler-Natta catalyst system. In accordance with other aspects of the present invention, the ethylene polymer can be produced using a metallocene-based catalyst system. In accordance with further aspects of the present invention, the ethylene polymer can be produced using a dual metallocene-based catalyst system. In these aspects, catalyst component I can comprise an unbridged metallocene compound, for instance, an unbridged zirconium or hafnium based metallocene compound containing two cyclopentadienyl groups, two indenyl groups, or a cyclopentadienyl and an indenyl group. Catalyst component II can comprise a bridged metallocene compound, for instance, a bridged zirconium or hafnium based metallocene compound with a cyclopentadienyl group and a fluorenyl group, and with an alkenyl substituent on the bridging group and/or on the cyclopentadienyl group.

Generally, catalyst component I can comprise an unbridged zirconium or hafnium based metallocene compound and/or an unbridged zirconium and/or hafnium based dinuclear metallocene compound. In one aspect, for instance, catalyst component I can comprise an unbridged zirconium or hafnium based metallocene compound containing two cyclopentadienyl groups, two indenyl groups, or a cyclopentadienyl and an indenyl group. In another aspect, catalyst component I can comprise an unbridged zirconium or hafnium based metallocene compound containing two cyclopentadienyl groups. In yet another aspect, catalyst component I can comprise an unbridged zirconium or hafnium based metallocene compound containing two indenyl groups. In still another aspect, catalyst component I can comprise an unbridged zirconium or hafnium based metallocene compound containing a cyclopentadienyl and an indenyl group.

In some aspects, catalyst component I can comprise an unbridged zirconium based metallocene compound containing two cyclopentadienyl groups, two indenyl groups, or a cyclopentadienyl and an indenyl group, while in other aspects, catalyst component I can comprise a dinuclear unbridged metallocene compound with an alkenyl linking group.

Catalyst component I can comprise, in particular aspects of this invention, an unbridged metallocene compound having formula (I):

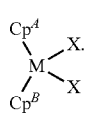

(I)

Within formula (I), M, $Cp^A$, $Cp^B$, and each X are independent elements of the unbridged metallocene compound. Accordingly, the unbridged metallocene compound having formula (I) can be described using any combination of M, $Cp^A$, $Cp^B$, and X disclosed herein.

Unless otherwise specified, formula (I) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with aspects of this invention, the metal in formula (I), M, can be Ti, Zr, or Hf. In one aspect, for instance, M can be Zr or Hf, while in another aspect, M can be Ti; alternatively, M can be Zr; or alternatively, M can be Hf.

Each X in formula (I) independently can be a monoanionic ligand. In some aspects, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $-OBR^1_2$, or $-OSO_2R^1$, wherein $R^1$ is a $C_1$ to $C_{36}$ hydrocarbyl group. It is contemplated that each X can be either the same or a different monoanionic ligand.

In one aspect, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR^1_2$, or $OSO_2R^1$, wherein $R^1$ is a $C_1$ to $C_{18}$ hydrocarbyl group. In another aspect, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR^1_2$, or $OSO_2R^1$, wherein $R^1$ is a $C_1$ to $C_{12}$ hydrocarbyl group. In another aspect, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR^1_2$, or $OSO_2R^1$, wherein $R^1$ is a $C_1$ to $C_{10}$ hydrocarbyl group. In yet another aspect, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR^1_2$, or $OSO_2R^1$, wherein $R^1$ is a $C_1$ to $C_8$ hydrocarbyl group. In still another aspect, each X independently can be a halide or a $C_1$ to $C_{18}$ hydrocarbyl group. For example, each X can be Cl.

In one aspect, each X independently can be H, $BH_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another aspect, each X independently can be H, $BH_4$, or a $C_1$ to $C_{18}$ hydrocarboxy group, hydrocarbylaminyl group, hydrocarbylsilyl group, or hydrocarbylaminylsilyl group. In yet another aspect, each X independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another aspect, each X can be H; alternatively, F; alternatively, Cl; alternatively, Br; alternatively, I; alternatively, $BH_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each X independently can be, in some aspects, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other aspects, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each X independently can be, in certain aspects, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (I), $Cp^A$ and $Cp^B$ independently can be a substituted or unsubstituted cyclopentadienyl or indenyl group. In one aspect, $Cp^A$ and $Cp^B$ independently can be an unsubstituted cyclopentadienyl or indenyl group. Alternatively, $Cp^A$ and $Cp^B$ independently can be a substituted indenyl or cyclopentadienyl group, for example, having up to 5 substituents.

If present, each substituent on $Cp^A$ and $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^A$ and/or $Cp^B$ can be either the same or a different substituent group. Moreover, each substituent can be at any position on the respective cyclopentadienyl or indenyl ring structure that conforms with the rules of chemical valence. In an aspect, the number of substituents on $Cp^A$ and/or on $Cp^B$ and/or the positions of each substituent on $Cp^A$ and/or on $Cp^B$ are independent of each other. For instance, two or more substituents on $Cp^A$ can be different, or alternatively, each substituent on $Cp^A$ can be the same. Additionally or alternatively, two or more substituents on $Cp^B$ can be different, or alternatively, all substituents on $Cp^B$ can be the same. In another aspect, one or more of the substituents on $Cp^A$ can be different from the one or more of the substituents on $Cp^B$, or alternatively, all substituents on both $Cp^A$ and/or on $Cp^B$ can be the same. In these and other aspects, each substituent can be at any position on the respective cyclopentadienyl or indenyl ring structure. If substituted, $Cp^A$ and/or $Cp^B$ independently can have one substituent, two substituents, three substituents, four substituents, and so forth.

In formula (I), each substituent on $Cp^A$ and/or on $Cp^B$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. In some aspects, each substituent independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{18}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be a substituent on $Cp^A$ and/or on $Cp^B$ in formula (I) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to X in formula (I)). A substituent on $Cp^A$ and/or on $Cp^B$ in formula (I) can be, in certain aspects, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, if present, each substituent on $Cp^A$ and/or $Cp^B$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group (or other substituted aryl group), a benzyl group, a naphthyl group, a trimethylsilyl group, a triisopropylsilyl group, a triphenylsilyl group, or an allyldimethylsilyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hex-enyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

Illustrative and non-limiting examples of unbridged metallocene compounds having formula (I) and/or suitable for use as catalyst component I can include the following compounds (Ph=phenyl):

(1)

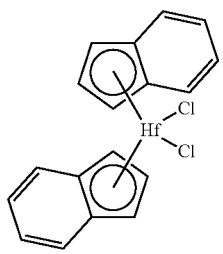

(2)

(3)

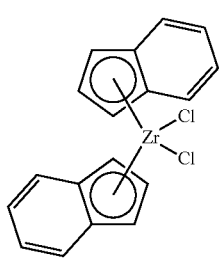

(4)

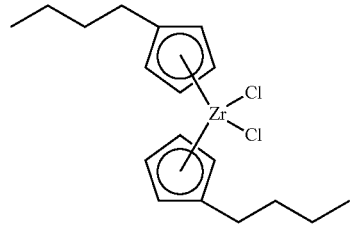

(5)

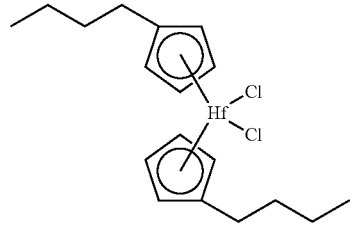

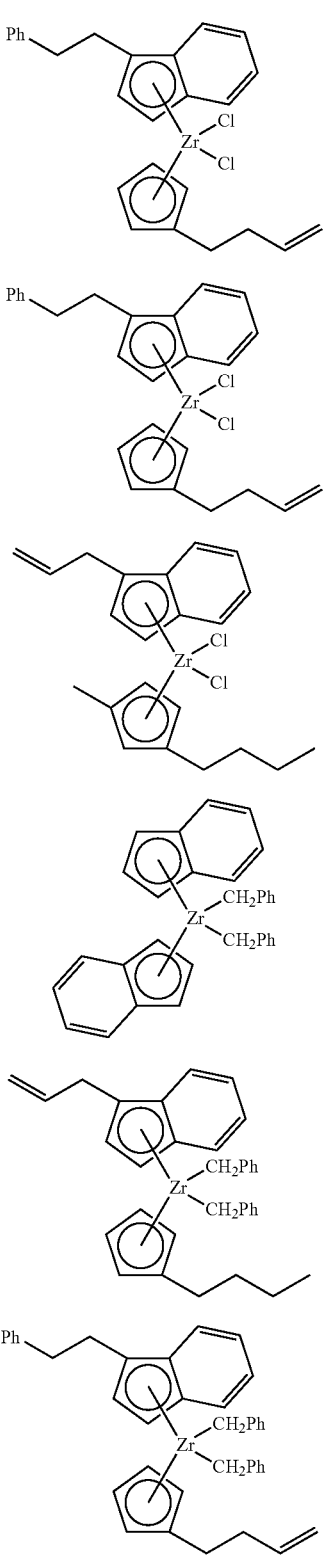

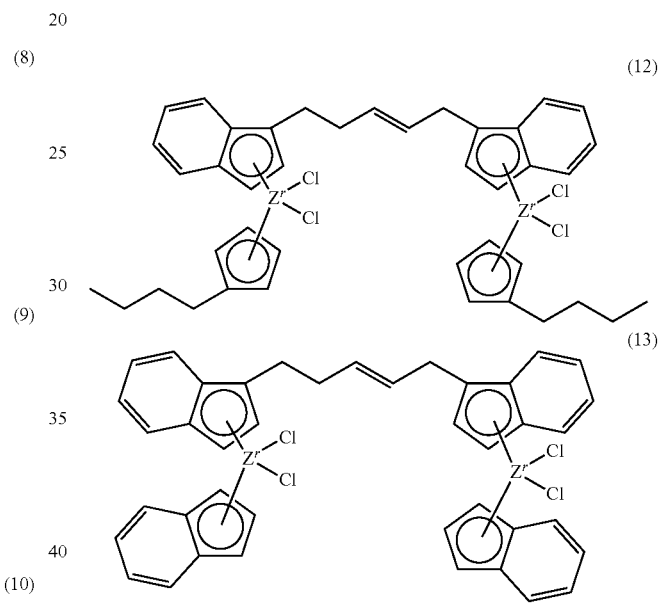

and the like, as well as combinations thereof.

Catalyst component I is not limited solely to unbridged metallocene compounds such as described above, or to suitable unbridged metallocene compounds disclosed in U.S. Pat. Nos. 7,199,073, 7,226,886, 7,312,283, and 7,619,047, which are incorporated herein by reference in their entirety. For example, catalyst component I can comprise an unbridged zirconium and/or hafnium based dinuclear metallocene compound. In one aspect, catalyst component I can comprise an unbridged zirconium based homodinuclear metallocene compound. In another aspect, catalyst component I can comprise an unbridged hafnium based homodinuclear metallocene compound. In yet another aspect, catalyst component I can comprise an unbridged zirconium and/or hafnium based heterodinuclear metallocene compound (i.e., dinuclear compound with two hafniums, or two zirconiums, or one zirconium and one hafnium). Catalyst component I can comprise unbridged dinuclear metallocenes such as those described in U.S. Pat. Nos. 7,919,639 and 8,080,681, the disclosures of which are incorporated herein by reference in their entirety. Illustrative and non-limiting examples of dinuclear metallocene compounds suitable for use as catalyst component I can include the following compounds:

and the like, as well as combinations thereof.

Generally, catalyst component II can comprise a bridged metallocene compound. In one aspect, for instance, catalyst component II can comprise a bridged zirconium or hafnium based metallocene compound. In another aspect, catalyst component II can comprise a bridged zirconium or hafnium based metallocene compound with an alkenyl substituent. In yet another aspect, catalyst component II can comprise a bridged zirconium or hafnium based metallocene compound with an alkenyl substituent and a fluorenyl group. In still another aspect, catalyst component II can comprise a bridged zirconium or hafnium based metallocene compound with a cyclopentadienyl group and a fluorenyl group, and with an alkenyl substituent on the bridging group and/or on the cyclopentadienyl group.

In some aspects, catalyst component II can comprise a bridged metallocene compound having an aryl group substituent on the bridging group, while in other aspects, catalyst component II can comprise a dinuclear bridged metallocene compound with an alkenyl linking group.

Catalyst component II can comprise, in particular aspects of this invention, a bridged metallocene compound having formula (II):

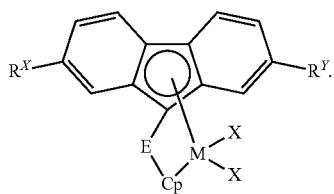

(II)

Within formula (II), M, Cp, $R^X$, $R^Y$, E, and each X are independent elements of the bridged metallocene compound. Accordingly, the bridged metallocene compound having formula (II) can be described using any combination of M, Cp, $R^X$, $R^Y$, E, and X disclosed herein.

The selections for M and each X in formula (II) are the same as those described herein above for formula (I). In formula (II), Cp can be a substituted cyclopentadienyl, indenyl, or fluorenyl group. In one aspect, Cp can be a substituted cyclopentadienyl group, while in another aspect, Cp can be a substituted indenyl group.

In some aspects, Cp can contain no additional substituents, e.g., other than bridging group E, discussed further herein below. In other aspects, Cp can be further substituted with one substituent, two substituents, three substituents, four substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the respective cyclopentadienyl, indenyl, or fluorenyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^A$ and $Cp^B$ in formula (I)).

In one aspect, for example, each substituent on Cp independently can be a $C_1$ to $C_{12}$ hydrocarbyl group or a $C_1$ to $C_{12}$ hydrocarbylsilyl group. In another aspect, each substituent on Cp independently can be a $C_1$ to $C_8$ alkyl group or a $C_3$ to $C_8$ alkenyl group. In yet another aspect, each substituent on Cp independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, $R^X$ and $R^Y$ in formula (II) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^A$ and $Cp^B$ in formula (I)). In one aspect, for example, $R^X$ and $R^Y$ independently can be H or a $C_1$ to $C_{12}$ hydrocarbyl group. In another aspect, $R^X$ and $R^Y$ independently can be a $C_1$ to $C_{10}$ hydrocarbyl group. In yet another aspect, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another aspect, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Bridging group E in formula (II) can be (i) a bridging group having the formula $>E^A R^A R^B$, wherein $E^A$ can be C, Si, or Ge, and $R^A$ and $R^B$ independently can be H or a $C_1$ to $C_{18}$ hydrocarbyl group; (ii) a bridging group having the formula $—CR^C R^D—CR^E R^F—$, wherein $R^C$, $R^D$, $R^E$, and $R^F$ independently can be H or a $C_1$ to $C_{18}$ hydrocarbyl group; or (iii) a bridging group having the formula $—SiR^G R^H—E^5 R^I R^J—$, wherein $E^5$ can be C or Si, and $R^G$, $R^H$, $R^I$, and $R^J$ independently can be H or a $C_1$ to $C_{18}$ hydrocarbyl group.

In the first option, the bridging group E can have the formula $>E^A R^A R^B$, wherein $E^A$ can be C, Si, or Ge, and $R^A$ and $R^B$ independently can be H or any $C_1$ to $C_{18}$ hydrocarbyl group disclosed herein. In some aspects of this invention, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In these and other aspects, $R^A$ and $R^B$ can be either the same or different.

In the second option, the bridging group E can have the formula $—CR^C R^D—CR^E R^F—$, wherein $R^C$, $R^D$, $R^E$, and $R^F$ independently can be H or any $C_1$ to $C_{18}$ hydrocarbyl group disclosed herein. For instance, $R^C$, $R^D$, $R^E$, and $R^F$ independently can be H or a methyl group.

In the third option, the bridging group E can have the formula $—SiR^G R^H—E^5 R^I R^J—$, wherein $E^5$ can be C or Si, and $R^G$, $R^H$, $R^I$, and $R^J$ independently can be H or any $C_1$ to $C_{18}$ hydrocarbyl group disclosed herein. For instance, $E^5$ can be Si, and $R^G$, $R^H$, $R^I$ and $R^J$ independently can be H or a methyl group.

Illustrative and non-limiting examples of bridged metallocene compounds having formula (II) and/or suitable for use as catalyst component II can include the following compounds (Me=methyl, Ph=phenyl; t-Bu=tert-butyl):

(14) 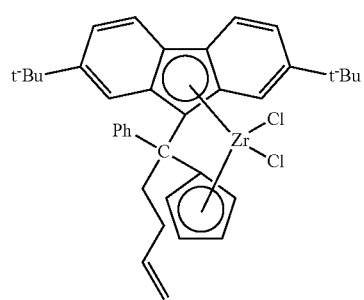
(15) 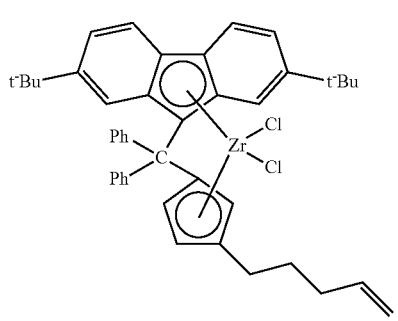
(16) 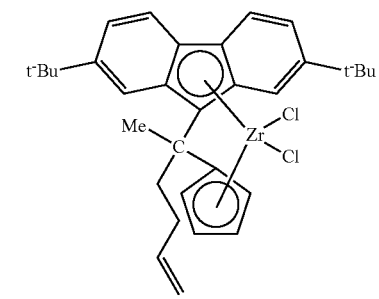
(17) 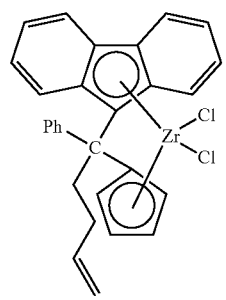
(18) 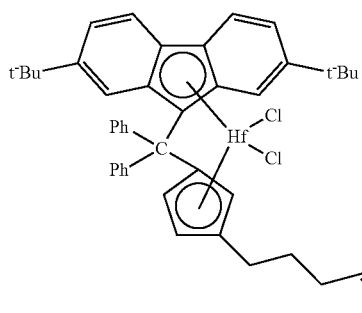
(19) 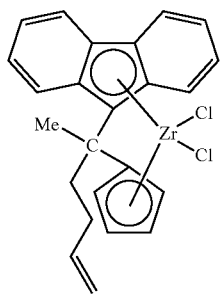
(20) 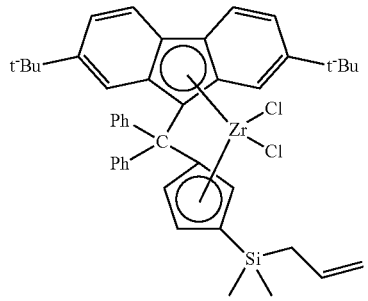
(21) 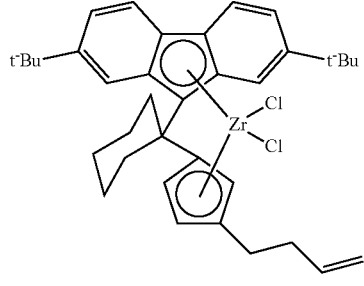
(22) 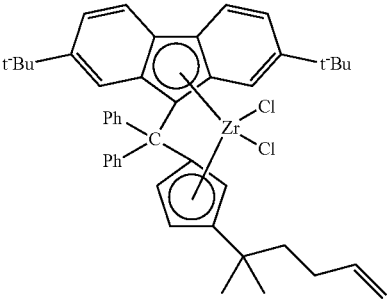
(23) 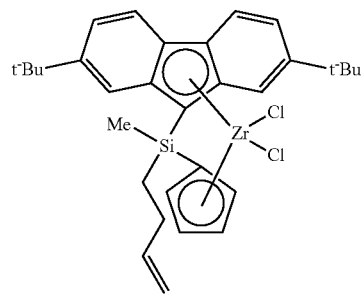

(24)
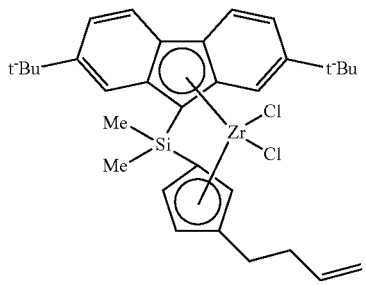
(25)
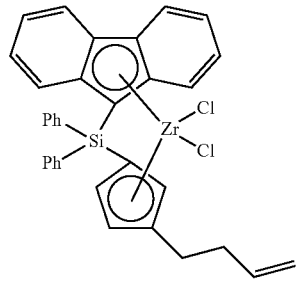
and the like, as well as combinations thereof.
Further examples of bridged metallocene compounds having formula (II) and/or suitable for use as catalyst component II can include, but are not limited to, the following compounds:
(26)
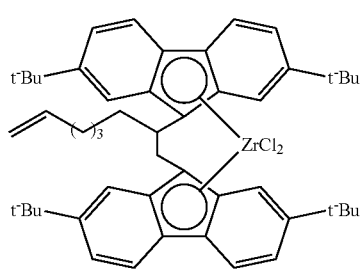
(27)
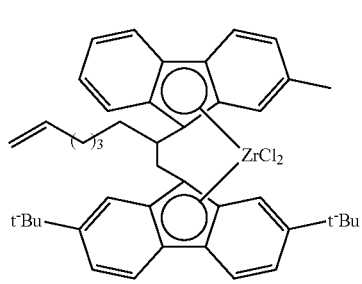
(28)
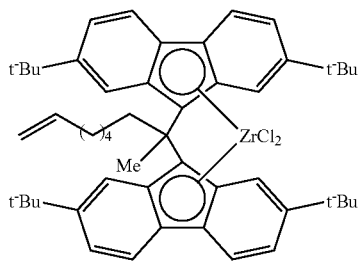
(29)
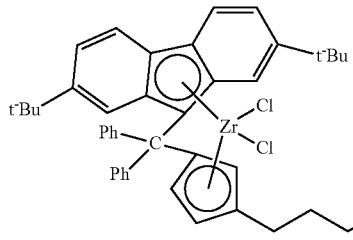
and the like, as well as combinations thereof.

Catalyst component II is not limited solely to the bridged metallocene compounds such as described above. Other suitable bridged metallocene compounds are disclosed in U.S. Pat. Nos. 7,026,494, 7,041,617, 7,226,886, 7,312,283, 7,517,939, and 7,619,047, which are incorporated herein by reference in their entirety.

According to an aspect of this invention, the weight ratio of catalyst component I to catalyst component II in the catalyst composition can be in a range from about 10:1 to about 1:10, from about 8:1 to about 1:8, from about 5:1 to about 1:5, from about 4:1 to about 1:4, from about 3:1 to about 1:3; from about 2:1 to about 1:2, from about 1.5:1 to about 1:1.5, from about 1.25:1 to about 1:1.25, or from about 1.1:1 to about 1:1.1.

Typically, the dual metallocene-based catalyst system contains an activator. For example, the catalyst system can contain an activator-support, an aluminoxane compound, an organoboron or organoborate compound, an ionizing ionic compound, and the like, or any combination thereof. The catalyst system can contain one or more than one activator.

In one aspect, the catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another aspect, the catalyst system can comprise an aluminoxane compound. In yet another aspect, the catalyst system can comprise an organoboron or organoborate compound. In still another aspect, the catalyst system can comprise an ionizing ionic compound.

In other aspects, the catalyst system can comprise an activator-support, for example, an activator-support comprising a solid oxide treated with an electron-withdrawing anion. Examples of such materials are disclosed in, for instance, U.S. Pat. Nos. 7,294,599, 7,601,665, 7,884,163, 8,309,485, 8,623,973, and 9,023,959, which are incorporated herein by reference in their entirety. For instance, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, sulfated silica-coated alumina, or phosphated silica-coated alumina, and the like, as well as any combination thereof. In some aspects, the activator-support can comprise a fluorided solid oxide and/or a sulfated solid oxide.

The present invention can employ catalyst compositions containing catalyst component I, catalyst component II, an activator (one or more than one), and optionally, a co-catalyst. When present, the co-catalyst can include, but is not limited to, metal alkyl, or organometal, co-catalysts, with the metal encompassing boron, aluminum, and the like. Optionally, the catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof.

The ethylene polymers can be produced using any suitable olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S.

Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of ethylene polymer. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min, pellet) was determined in accordance with ASTM D1238 at 190° C. with a 2,160 gram weight, and high load melt index (HLMI, g/10 min, pellet) was determined in accordance with ASTM D1238 at 190° C. with a 21,600 gram weight. Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703. ESCR was determined in accordance with ASTM D1693, condition B, with 10% igepal.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MAR-LEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of each component of the molecular weight distribution curve).

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau($\eta$));
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987); each of which is incorporated herein by reference in its entirety.

A creep adjustment was used to extend the low frequency range of rheological characterization to $10^{-4}$ sec$^{-1}$. In the creep test, a constant shear stress $\sigma_0$ was applied to the specimen and the shear strain $\gamma$ was recorded as a function of creep time t. Although the time-dependent data generated by the creep and creep recovery tests look different from the frequency-dependent data measured in the dynamic frequency sweep test, as long as the measurements are performed in the linear viscoelastic regime, these two experimental data sets contain the same rheological information, so that the time-dependent creep compliance data can be transformed into the frequency-dependent dynamic data, and thus the long time creep measurement can supplement the low frequency data of the dynamic frequency sweep measurement.

The generalized Voigt model was used for modeling the time-dependent creep compliance $J(t)=\gamma(t)/\sigma_0$ in terms of a discrete spectrum $J_k$ of retardation times $\tau_k$ and zero shear rate viscosity $$J(t) = \sum_{k=1}^{N} J_k(1 - e^{-t/\tau_k}) + \frac{t}{\eta_0}.$$

If the discrete retardation spectrum accurately describes the compliance data, the theory of linear viscoelasticity permits a quantitative description of other types of experimental data, for example, the storage and the loss compliance calculated as $$J'(\omega) = \sum_{k=1}^{N} J_k \frac{1}{1 + \omega^2 \tau_k^2},$$

$$J''(\omega) = \frac{1}{\omega \eta_0} + \sum_{k=1}^{N} J_k \frac{\omega \tau_k}{1 + \omega^2 \tau_k^2}.$$

From the relationship between the complex modulus and the complex compliance, the storage and loss modulus of dynamic frequency sweep data can be obtained as $$G'(\omega) = \frac{J''(\omega)}{[J'(\omega)]^2 + [J''(\omega)]^2}.$$

$$G'(\omega) = \frac{J'(\omega)}{[J'(\omega)]^2 + [J''(\omega)]^2},$$

As a simple numerical approach to obtain the discrete spectrum of retardation times, the Microsoft Excel Solver tool can be used by minimizing the following objective function O.

$$O = \sum_{i=1}^{N} \frac{[J_{exp}(t_i) - J_{model}(t_i)]^2}{[J_{exp}(t_i)]^2}.$$

For reliable conversion of the time-dependent creep data into the frequency-dependent dynamic data, the frequency range needs to be limited by the testing time of the creep measurement. If it is possible to obtain precise experimental data over the entire range of creep time until the creep compliance reaches the steady state, the exact function of retardation spectra over the entire range of time scale also can be calculated. However, it is often not practical to obtain such data for high molecular weight polymers, which have very long relaxation times. The creep data only contain information within a limited range of time, so that the frequency range is limited by the duration time $t_N$ of the creep test, i.e., valid information for frequencies is in the range of $\omega > t_N^{-1}$, and the extrapolated data outside this frequency range can be influenced by artifacts of the fittings.

For the rheological measurements involving a creep adjustment, the polymer samples were compression molded at 182° C. for a total of 3 min. The samples were allowed to melt at a relatively low pressure for 1 min and then subjected to a high molding pressure for an additional 2 min. The molded samples were then quenched in a room temperature press, and then 25.4 mm diameter disks were stamped out of the molded slabs for the measurement in the rotational rheometer. The measurements were performed in parallel plates of 25 mm diameter at 190° C. using a controlled-stress rheometer equipped with an air bearing system (Physica MCR-500, Anton Paar). The test chamber of the rheometer was purged with nitrogen to minimize oxidative degradation. After thermal equilibration, the specimens were squeezed between the plates to a 1.6 mm thickness, and the excess was trimmed. A total of 8 min elapsed between the time the sample was inserted and the time the test was started. For the dynamic frequency sweep measurement, small-strain (1-10%) oscillatory shear in the linear viscoelastic regime was applied at angular frequencies from 0.0316 to 316 $\sec^{-1}$. The creep test was performed for 10,200 sec (170 min) to limit the overall testing time within 4 hr, since sample throughput and thermal stability were concerns. By converting the time dependent creep data to frequency dependent dynamic data, the low frequency range was extended down to $10^{-4}$ rad/sec, two orders of magnitude lower than the frequency range of the dynamic test. The complex viscosity ($|\eta^*|$) versus frequency ($\omega$) data were curve fitted using the Carreau-Yasuda model.

One of the major concerns in performing the creep test, and indeed any long time scale measurement, was that the sample does not appreciably change during the measurement, which may take several hours to perform. If a polymer sample is heated for long time period without proper thermal stabilization (e.g., antioxidants), changes in the polymer can occur that can have a significant effect on the rheological behavior of the polymer and its characterization. Polymers which are being tested should have thermal stability for at least 4-5 hr at 190° C. under nitrogen; for example, ethylene polymers containing at least 0.4 wt. % of antioxidants were found to be stable enough to obtain valid creep adjustment data.

For the rheological measurement in the parallel plates, the specimen was squeezed between the plates to a 1.6 mm thickness, and then the excess was trimmed. When the sample was trimmed with large forces on one direction, some residual stress was generated to cause the strain to drift. Therefore, performing the creep test right after sample trimming should be avoided, because the residual stress can affect the subsequent creep measurement, particularly for the highly viscoelastic resins having long relaxation times. If the applied stress of the creep test is not large enough, the resulting strain can be so small that the creep results can be influenced by the artifact of the strain drifting. In order to minimize this effect, samples were trimmed as gently as possible, and the creep test was conducted after 2000 sec of waiting time, in order to allow relaxation of any residual stress.

The appropriate magnitude of applied stress $\sigma_0$ is important for reliable creep data. The stress $\sigma_0$ must be sufficiently small such that the strain will stay within the linear viscoelastic regime, and it must be sufficiently large such that the strain signal is strong enough to provide satisfactory resolution of data for good precision. Although not limited thereto, a suitable applied stress was equal to the complex modulus $|G^*|$ at a frequency of 0.01 rad/sec multiplied by 0.04.

The long chain branches (LCB) per 1000 total carbon atoms can be calculated using the method of Janzen and Colby (J. Mol. Struct., 485/486, 569-584 (1999)), from values of zero shear viscosity, $\eta_o$ (determined from the Carreau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, Polymer Preprints, 44, 49-50 (2003). These references are incorporated herein by reference in their entirety.

Short chain branch (SCB) content and short chain branching distribution (SCBD) across the molecular weight distribution can be determined via an IR5-detected GPC system (IR5-GPC), wherein the GPC system is a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) is connected to the GPC columns via a hot-transfer line. Chromatographic data are obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions are set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content is determined via an in-house method using the intensity ratio of $CH_3$ ($I_{CH3}$) to $CH_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) is used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution are obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Sulfated alumina activator-supports used in Examples 1-6 were prepared as follows. Bohemite was obtained from W.R. Grace & Company under the designation "Alumina A." This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

Pilot plant polymerizations were conducted in a 30-gallon slurry loop reactor at a production rate of approximately 30 pounds of polymer per hour. Polymerization runs were carried out under continuous particle form process conditions in a loop reactor (also referred to as a slurry process) by contacting separate metallocene solutions, an organoaluminum solution (triisobutylaluminum, TIBA), and an activator-support (sulfated alumina) in a 1-L stirred autoclave (30 min residence time) with output to the loop reactor. The weight ratio of activator-support to total metallocene (first metallocene and second metallocene compounds) was approximately 1.6:1.

Ethylene used was polymerization grade ethylene which was purified through a column of AZ 300 (activated at 300-500° F. in nitrogen). 1-Hexene was polymerization grade 1-hexene (obtained from Chevron Phillips Chemical Company) which was purified by nitrogen purging and storage over AZ 300 activated at 300-500° F. in nitrogen. Liquid isobutane was used as the diluent.

Certain polymerization conditions for Examples 1-6 are provided in Table I below (mole % ethylene and ppm by weight of triisobutylaluminum (TIBA) are based on isobutane diluent). The polymerization conditions also included a reactor pressure of 590 psig, a polymerization temperature of 90° C., a feed rate of 37-43 lb/hr ethylene, and 2.9-4.0 ppm total of MET 1 and MET 2 (based on the weight of isobutane diluent). The structures for MET 1 and MET 2, used in Examples 1-6, are shown below:

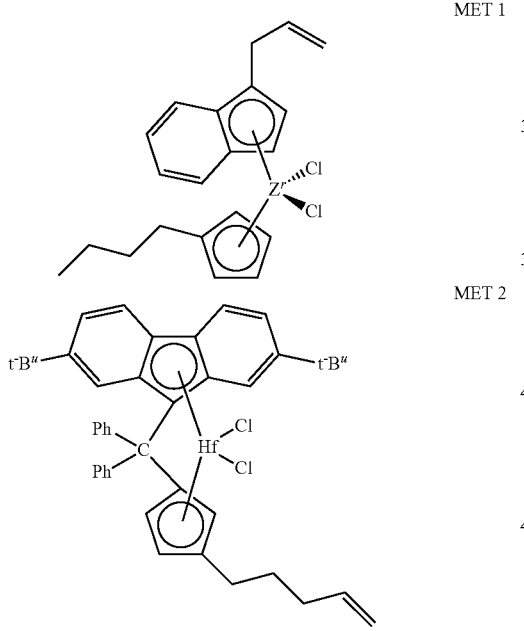

MET 1

MET 2

TABLE I

Examples 1-6 - Polymerization Conditions.

| Example | 1-Hexene (lb/hr) | $H_2$ (lb/hr) | Weight ratio MET 1/MET 2 | $C_2H_4$ mole % | TIBA ppm |
|---|---|---|---|---|---|
| 1 | 0.28 | 0.0041 | 1.03 | 11.77 | 143 |
| 2 | 0.24 | 0.0039 | 1.31 | 11.78 | 129 |
| 3 | 0.26 | 0.0037 | 1.34 | 11.99 | 109 |
| 4 | 0.30 | 0.0037 | 1.20 | 11.90 | 117 |
| 5 | 0.23 | 0.0037 | 1.27 | 11.71 | 110 |
| 6 | 0.28 | 0.0037 | 1.27 | 11.93 | 118 |

For Examples 1-8, blow molded 1-gallon containers were produced from the polymer resins under the conditions listed in Table II on a Uniloy reciprocating blow molding machine with an extruder screw diameter of 2.5" and a L/D Ratio of 20:1. The parison was extruded using a 2.5" diverging die and then blown into a mold to produce 1-gallon industrial bottles weighing approximately 105 g.

Bottle topload strength was determined in accordance with ASTM D2659, but with 1-gallon bottles (105 g empty weight), filled full of water, and with caps on. The bottles were aged for 24 hours at room temperature prior to testing for topload strength, and the bottles were tested at a test speed of 1 inch/min and at a deflection of 0.40 inch. Four bottles were tested for each sample, and the average was recorded.

Die swell (%) is the relative size of the parison versus the die size, and was determined as follows. The width of the flashing at the bottom of the bottle (layflat bottom, LF) was measured, and converted to % die swell (diameter) using the following conversions:

Maximum parison circumference (PC)=2×LF

Maximum parison diameter (PD)=PC/π

PD=2×LF/π

Die swell (%)=(PD/DD−1)×100%, where DD is die diameter (2.5")

Die swell (%)=(((2×LF/π)/2.5)−1)×100%

Examples 1-8

FIG. 1 illustrates the bimodal molecular weight distributions (amount of polymer versus the logarithm of molecular weight) of the polymers of Examples 1 and 3-5, and Table III summarizes the molecular weight characteristics of the polymers of Examples 1-6. The polymers of Examples 1-6 had Mz values ranging from 1,600,000 to 2,300,000 g/mol, Mw values ranging from 260,000 to about 370,000 g/mol, Mn values ranging from 13,000 to 21,000 g/mol, Mw/Mn values ranging from 12 to 21, and Mz/Mw values ranging from 5 to 8.

Table IV summarizes the properties of the LMW component and the HMW component of the polymers of Examples 1 and 3-5. The respective LMW and HMW component properties were determined by deconvoluting the molecular weight distribution (see e.g., FIG. 1) of each polymer. The relative amounts of the LMW and HMW components (weight percentages) in the polymer, and Mp of the LMW component and Mp of the HMW component, were determined using a commercial software program (Systat Software, Inc., Peak Fit™ v. 4.05). The other molecular weight parameters for the LMW and HMW components (e.g., Mn, Mw, Mz, etc., of each component) were determined by using the deconvoluted data from the Peak Fit™ program, and applying a Schulz-Flory distribution mathematical function and a Gaussian peak fit, as generally described in U.S. Pat. No. 7,300,983, which is incorporated herein by reference in its entirety. As shown in Table IV, the wt. % of the HMW component ranged from about 17 to 25 wt. %, the Mw of the HMW component ranged from 1,200,000 to 1,300,000 g/mol, the Mw/Mn of the HMW component ranged from 2.0 to 2.4, the Mw of the LMW component ranged from 56,000 to 64,000 g/mol, and the Mz/Mw of the LMW component ranged from 1.8 to 2.1.

Table V summarizes certain rheological properties at 190° C. for the polymers of Examples 1-6. These polymers had high zero-shear viscosity values ranging from $6 \times 10^5$ to $2 \times 10^6$ Pa-sec for good melt strength in blow molding, and viscosities at 100 sec$^{-1}$ ($\eta$ @ 100) ranging from 1100 to 1700 Pa-sec for good processability. These rheological parameters were determined using the Carreau-Yasuda model with creep adjustment.

The die swell of the polymer appears to correlate with the rheological slope parameter, i.e., the slope of a plot of the viscosity (Pa-sec) versus shear rate (sec$^{-1}$) at 100 sec$^{-1}$ for the ethylene polymer at 190° C. Generally, the lower the rheological slope parameter, the lower the die swell. Table V demonstrates that the polymers of Examples 1-6 had rheological slope parameters in the 0.20-0.25 range, and thus would have reduced die swell as compared to polymers with rheological slope parameters above 0.3, or above 0.4.

Table VI summarizes the melt flow, density, and certain bottle properties of Examples 1-8. Comparative Example 7 and Comparative Example 8 were broad monomodal ethylene copolymer resins produced using a chromium-based catalyst system (Chevron-Phillips Chemical Company LP). The polymers of Examples 1-6 had densities ranging from 0.956 to 0.958 g/cm$^3$, MI's ranging from 0.04 to 0.18 g/10 min, HLMI's ranging from 17 to 38 g/10 min, and ratios of HLMI/MI ranging from 200 to 430. The chromium-based polymers of Examples 7-8 had similar HLMI's, but higher MI's, lower ratios of HLMI/MI, and lower densities. Unexpectedly, however, the ESCR (10% igepal) properties of Examples 1-6 were far superior to those of Examples 7-8; for instance, the ESCR properties of Examples 1-6 (greater than 1300 hr) were 5-10 times better than that of Examples 7-8. Hence, the polymers described herein can provide improved ESCR at an equivalent (or higher) density and/or HLMI, as compared to chromium-based resins. In addition, the bottle topload strength for the polymers of Examples 1-6 ranged from 173 to 184 lb, a significant improvement in strength over the polymers of Examples 7-8 (147 to 156 lb).

Notwithstanding the increases in ESCR and strength properties shown in Table VI, the polymers of Examples 1-6 had surprisingly comparable die swell characteristics (31-38%) to the chromium-based polymers of Examples 7-8 (28-43%), as shown in Table II, as well as comparable cycle times (output rates).

TABLE II

Blow Molding Processing of Examples 1-8

| Example | Die Swell (%) | Die Gap (in) | Motor Load (amps) | Back Pressure (psig) | Head Pressure (psig) | Temp Profile (° F.) | Machine Melt Temp (° F.) | Pool Melt Temp (° F.) | Cycle Time (sec) |
|---|---|---|---|---|---|---|---|---|---|
| 1 | 31 | 0.024 | 31 | 60 | 4960 | 420 | 457 | 453 | 16.5 |
| 2 | 36 | 0.024 | 26 | 95 | 5008 | 420 | 454 | 457 | 16.2 |
| 3 | 36 | 0.022 | 29 | 165 | 4111 | 420 | 460 | 430 | 17.8 |
| 4 | 38 | 0.022 | 31 | 125 | 5448 | 420 | 458 | 457 | 16.1 |
| 5 | 37 | 0.022 | 29 | 190 | 3660 | 420 | 457 | 448 | 18.2 |
| 6 | 36 | 0.022 | 30 | 100 | 5288 | 420 | 458 | 463 | 16.6 |
| 7 | 28 | 0.024 | 32 | 230 | 4810 | 420 | 463 | 472 | 17.5 |
| 8 | 43 | 0.024 | 32 | 240 | 4896 | 420 | 460 | 475 | 17.0 |

TABLE III

Examples 1-6 - Molecular Weight Characterization (molecular weights in g/mol)

| Example | Mn/1000 | Mw/1000 | Mz/1000 | Mw/Mn | Mz/Mw |
|---|---|---|---|---|---|
| 1 | 20.7 | 362.2 | 2250 | 17.5 | 6.2 |
| 2 | 21.0 | 269.6 | 1601 | 12.9 | 5.9 |
| 3 | 13.4 | 275.3 | 1922 | 20.6 | 7.0 |
| 4 | 20.3 | 287.2 | 1934 | 14.1 | 6.7 |
| 5 | 18.4 | 264.0 | 1892 | 14.4 | 7.2 |
| 6 | 19.8 | 292.7 | 1950 | 14.8 | 6.7 |

TABLE IV

LMW Component and HMW Component Properties of Examples 1 and 3-5 (molecular weights in kg/mol)

| | LMW Component Properties | | | | | | | HMW Component Properties | | | | | |
|---|---|---|---|---|---|---|---|---|---|---|---|---|---|
| Example | % | Mn | Mw | Mz | Mp | Mw/Mn | Mz/Mw | % | Mn | Mw | Mz | Mp | Mw/Mn | Mz/Mw |
| 1 | 75 | 12.9 | 56.7 | 119 | 49.4 | 4.4 | 2.1 | 25 | 613 | 1282 | 2380 | 950 | 2.1 | 1.9 |
| 3 | 82 | 12.4 | 58.1 | 111 | 56.2 | 4.7 | 1.9 | 18 | 630 | 1274 | 2185 | 999 | 2.0 | 1.7 |
| 4 | 81 | 12.4 | 58.5 | 110 | 58.9 | 4.7 | 1.9 | 19 | 531 | 1202 | 2123 | 982 | 2.3 | 1.8 |
| 5 | 83 | 13.5 | 63.6 | 116 | 61.1 | 4.7 | 1.8 | 17 | 502 | 1203 | 2094 | 1021 | 2.4 | 1.7 |

TABLE V

Examples 1-6 - Rheological Characterization at 190° C.

| Example | Zero shear viscosity ($\eta_o$) (Pa-sec) | $\eta$ @ 0.1 sec$^{-1}$ (Pa-sec) | $\eta$ @ 100 sec$^{-1}$ (Pa-sec) | Rheological Slope Parameter @ 100 sec$^{-1}$ |
|---|---|---|---|---|
| 1 | 1.35E+06 | 2.03E+05 | 1680 | 0.208 |
| 2 | 6.56E+05 | 1.29E+05 | 1460 | 0.226 |
| 3 | 9.24E+05 | 1.15E+05 | 1200 | 0.229 |
| 4 | 1.15E+06 | 1.25E+05 | 1270 | 0.229 |
| 5 | 1.07E+06 | 9.70E+04 | 1160 | 0.249 |
| 6 | 1.07E+06 | 1.33E+05 | 1340 | 0.226 |

TABLE VI

Examples 1-8 - Melt Flow, Density, and Bottle Properties

| Example | Density (g/cc) | MI (g/10 min) | HLMI (g/10 min) | HLMI/MI | Bottle Topload Strength (lb) | ESCR (condition B, 10% igepal, hr) |
|---|---|---|---|---|---|---|
| 1 | 0.9562 | 0.18 | 36.7 | 204 | 178 | >1300 |
| 2 | 0.9568 | 0.10 | 32.2 | 322 | 173 | >1300 |
| 3 | 0.9561 | 0.12 | 31.5 | 262 | 184 | >1300 |
| 4 | 0.9573 | 0.10 | 29.2 | 292 | 178 | >1300 |
| 5 | 0.9573 | 0.04 | 17.2 | 430 | 180 | >1300 |
| 6 | 0.9565 | 0.10 | 37.1 | 371 | 177 | >1300 |
| 7 | 0.955 | 0.31 | 32.4 | 105 | 156 | 125 |
| 8 | 0.954 | 0.32 | 31.7 | 99 | 147 | 225 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

An ethylene polymer having a density of greater than or equal to about 0.954 g/cm$^3$, a high load melt index (HLMI) in a range from about 10 to about 45 g/10 min, a ratio of high load melt index to melt index (HLMI/MI) in a range from about 175 to about 600, a slope of a plot of the viscosity (in Pa-sec) versus shear rate (in sec$^{-1}$) of the ethylene polymer at 100 sec$^{-1}$ in a range from about 0.15 to about 0.30, and an environmental stress crack resistance (ESCR, 10% igepal) of greater than or equal to about 800 hours.

Embodiment 2

The polymer defined in embodiment 1, wherein the ethylene polymer has a density in any range disclosed herein, e.g., greater than or equal to about 0.9545, greater than or equal to about 0.955, from about 0.954 to about 0.965, from about 0.9545 to about 0.962, from about 0.955 to about 0.965, from about 0.954 to about 0.962, from about 0.955 to about 0.960 g/cm$^3$, etc.

Embodiment 3

The polymer defined in any one of the preceding embodiments, wherein the ethylene polymer has a HLMI in any range disclosed herein, e.g., from about 12 to about 42, from about 15 to about 40, from about 15 to about 38, from about 15 to about 35, from about 16 to about 40, from about 16 to about 38, from about 16 to about 35, from about 17 to about 38 g/10 min, etc.

Embodiment 4

The polymer defined in any one of the preceding embodiments, wherein the ethylene polymer has a ratio of HLMI/MI in any range disclosed herein, e.g., from about 190 to about 550, from about 200 to about 500, from about 210 to about 500, from about 210 to about 480, from about 200 to about 480, from about 200 to about 460, from about 210 to about 460, etc.

Embodiment 5

The polymer defined in any one of the preceding embodiments, wherein the ethylene polymer has a slope of a plot of the viscosity (in Pa-sec) versus shear rate (in sec$^{-1}$) of the ethylene polymer at 100 sec$^{-1}$ (and 190° C.) in any range disclosed herein, e.g., from about 0.15 to about 0.28, from about 0.15 to about 0.27, from about 0.16 to about 0.30, from about 0.16 to about 0.28, from about 0.17 to about 0.27, etc.

Embodiment 6

The polymer defined in any one of the preceding embodiments, wherein the ethylene polymer has an environmental stress crack resistance (ESCR, 10% igepal) in any range disclosed herein, e.g., greater than or equal to about 1000 hours, greater than or equal to about 1100 hours, greater than or equal to about 1200 hours, greater than or equal to about 1300 hours, etc.

Embodiment 7

The polymer defined in any one of the preceding embodiments, wherein the ethylene polymer has a density in a range from about 0.954 to about 0.962 g/cm$^3$ (or from about 0.9545 to about 0.962 g/cm$^3$, or from about 0.955 to about 0.960 g/cm$^3$), a HLMI in a range from about 15 to about 40 g/10 min (or from about 15 to about 38 g/10 min, or from about 15 to about 35 g/10 min), a ratio of HLMI/MI in a range from about 190 to about 550 (or from about 200 to about 500, or from about 210 to about 480), a slope of a plot of the viscosity (in Pa-sec) versus shear rate (in sec$^{-1}$) of the ethylene polymer at 100 sec$^{-1}$ in a range from about 0.15 to about 0.28 (or from about 0.16 to about 0.28, or from about 0.17 to about 0.27), and an environmental stress crack resistance (ESCR, 10% igepal) of greater than or equal to about 1000 hours (or greater than or equal to about 1100 hours, or greater than or equal to about 1200 hours).

Embodiment 8

The polymer defined in any one of the preceding embodiments, wherein the ethylene polymer has a MI in any range disclosed herein, e.g., from about 0.01 to about 0.5, from about 0.01 to about 0.25, from about 0.01 to about 0.2, from about 0.02 to about 0.25, from about 0.02 to about 0.2 g/10 min, etc.

Embodiment 9

The polymer defined in any one of the preceding embodiments, wherein the ethylene polymer has less than about 0.008 long chain branches (LCB) per 1000 total carbon atoms, e.g., less than about 0.005 LCB, less than about 0.003 LCB, etc.

Embodiment 10

The polymer defined in any one of the preceding embodiments, wherein the ethylene polymer has a non-conventional (reverse) comonomer distribution, e.g., the number of short chain branches (SCB) per 1000 total carbon atoms of the polymer at Mw is greater than the number at Mn, the number of short chain branches (SCB) per 1000 total carbon atoms of the polymer at Mz is greater than the number at Mw, the number of SCB per 1000 total carbon atoms of the polymer at Mz is greater than the number at Mn, the number of short chain branches (SCB) per 1000 total carbon atoms of the polymer at a molecular weight of $10^6$ is greater than the number at a molecular weight of $10^5$, etc.

Embodiment 11

The polymer defined in any one of the preceding embodiments, wherein the ethylene polymer has a Mw in any range disclosed herein, e.g., from about 200,000 to about 400,000, from about 225,000 to about 400,000, from about 250,000 to about 400,000, from about 250,000 to about 350,000, from about 240,000 to about 360,000, from about 240,000 to about 300,000 g/mol, etc.

Embodiment 12

The polymer defined in any one of the preceding embodiments, wherein the ethylene polymer has a Mn in any range disclosed herein, e.g., from about 10,000 to about 40,000, from about 10,000 to about 30,000, from about 10,000 to about 20,000, from about 11,000 to about 30,000, from about 11,000 to about 25,000 g/mol, etc.

Embodiment 13

The polymer defined in any one of the preceding embodiments, wherein the ethylene polymer has a z-average molecular weight (Mz) in any range disclosed herein, e.g., from about 1,400,000 to about 3,000,000, from about 1,500,000 to about 2,500,000, from about 1,500,000 to about 2,000,000, from about 1,400,000 to about 2,400,000, from about 1,600,000 to about 2,200,000 g/mol, etc.

Embodiment 14

The polymer defined in any one of the preceding embodiments, wherein the ethylene polymer has a ratio of Mw/Mn in any range disclosed herein, e.g., from about 8 to about 25, from about 8 to about 22, from about 10 to about 25, from about 12 to about 25, from about 10 to about 22, from about 11 to about 21, from about 12 to about 21, etc.

Embodiment 15

The polymer defined in any one of the preceding embodiments, wherein the ethylene polymer has a ratio of Mz/Mw in any range disclosed herein, e.g., from about 4.5 to about 8.5, from about 5 to about 8.5, from about 5 to about 8, from about 6 to about 8, from about 6.5 to about 7.5, etc.

Embodiment 16

The polymer defined in any one of the preceding embodiments, wherein the ethylene polymer has a zero-shear viscosity (using the Carreau-Yasuda model with creep adjustment) in any range disclosed herein, e.g., greater than or equal to about $1\times10^5$, greater than or equal to about $2\times10^5$, in a range from about $1\times10^5$ to about $1\times10^7$, in a range from about $2\times10^5$ to about $1\times10^7$, in a range from about $5\times10^5$ to about $5\times10^6$, in a range from about $6\times10^5$ to about $2\times10^6$ Pa-sec, etc.

Embodiment 17

The polymer defined in any one of the preceding embodiments, wherein the ethylene polymer has a viscosity at 100 $sec^{-1}$ (eta @ 100 or $\eta$ @ 100) in any range disclosed herein, e.g., from about 800 to about 2000, from about 800 to about 1800, from about 800 to about 1700, from about 900 to about 1800, from about 1000 to about 2000, from about 1000 to about 1800 Pa-sec, etc.

Embodiment 18

The polymer defined in any one of the preceding embodiments, wherein the ethylene polymer comprises a high or higher molecular weight (HMW) component and a low or lower molecular weight (LMW) component.

Embodiment 19

The polymer defined in any one of the preceding embodiments, wherein the ethylene polymer has a bimodal molecular weight distribution.

Embodiment 20

The polymer defined in any one of embodiments 18-19, wherein the HMW component has a peak molecular weight (Mp) in any range disclosed herein, e.g., from about 800,000 to about 1,200,000, from about 850,000 to about 1,100,000, from about 900,000 to about 1,200,000, from about 900,000 to about 1,100,000 g/mol, etc.

Embodiment 21

The polymer defined in any one of embodiments 18-20, wherein the HMW component has a weight-average molecular weight (Mw) in any range disclosed herein, e.g., from about 1,000,000 to about 1,500,000, from about 1,000,000 to about 1,400,000, from about 1,100,000 to about 1,400,000, from about 1,050,000 to about 1,350,000 g/mol, etc.

Embodiment 22

The polymer defined in any one of embodiments 18-21, wherein the HMW component has a number-average molecular weight (Mn) in any range disclosed herein, e.g., from about 400,000 to about 800,000, from about 400,000 to about 700,000, from about 450,000 to about 800,000, from about 450,000 to about 700,000 g/mol, etc.

Embodiment 23

The polymer defined in any one of embodiments 18-22, wherein the HMW component has a ratio of Mz/Mw in any range disclosed herein, e.g., less than or equal to about 2.5, less than or equal to about 2.2, from about 1.5 to about 2.2, from about 1.5 to about 2, etc.

Embodiment 24

The polymer defined in any one of embodiments 18-23, wherein the HMW component has a ratio of Mw/Mn in any range disclosed herein, e.g., less than or equal to about 3, less than or equal to about 2.5, from about 1.8 to about 2.7, from about 1.8 to about 2.5, etc.

Embodiment 25

The polymer defined in any one of embodiments 18-24, wherein the LMW component has a peak molecular weight (Mp) in any range disclosed herein, e.g., from about 40,000 to about 75,000, from about 45,000 to about 80,000, from about 45,000 to about 75,000, from about 45,000 to about 65,000 g/mol, etc.

Embodiment 26

The polymer defined in any one of embodiments 18-25, wherein the LMW component has a weight-average molecular weight (Mw) in any range disclosed herein, e.g., from about 42,000 to about 80,000, from about 42,000 to about 75,000, from about 50,000 to about 80,000, from about 50,000 to about 70,000 g/mol, etc.

Embodiment 27

The polymer defined in any one of embodiments 18-26, wherein the LMW component has a number-average molecular weight (Mn) in any range disclosed herein, e.g., from about 8,000 to about 25,000, from about 10,000 to about 25,000, from about 10,000 to about 20,000, from about 10,000 to about 18,000 g/mol, etc.

Embodiment 28

The polymer defined in any one of embodiments 18-27, wherein the LMW component has a ratio of Mz/Mw in any range disclosed herein, e.g., less than or equal to about 2.8, from about 1.5 to about 2.8, from about 1.6 to about 2.7, from about 1.6 to about 2.5, from about 1.6 to about 2.4, from about 1.7 to about 2.3, etc.

Embodiment 29

The polymer defined in any one of embodiments 18-28, wherein the LMW component has a ratio of Mw/Mn in any range disclosed herein, e.g., from about 3 to about 6, from about 3.5 to about 5.5, from about 4 to about 5, etc.

Embodiment 30

The polymer defined in any one of embodiments 18-29, wherein an amount of the HMW component, based on the total polymer, is in any range of weight percentages disclosed herein, e.g., less than or equal to about 30%, less than or equal to about 26%, less than or equal to about 24%, less than or equal to about 22%, from about 10 to about 26%, from about 10 to about 24%, from about 12 to about 30%, from about 12 to about 26%, from about 12 to about 24%, from about 14 to about 28%, from about 14 to about 24%, etc.

Embodiment 31

The polymer defined in any one of the preceding embodiments, wherein the ethylene polymer has a die swell in any range disclosed herein, e.g., from about 28 to about 43%, from about 28 to about 40%, from about 30 to about 40%, from about 32 to about 42%, from about 34 to about 42%, from about 34 to about 40%, etc.

Embodiment 32

The polymer defined in any one of the preceding embodiments, wherein the ethylene polymer has a bottle topload strength in any range disclosed herein, e.g., from about 150 to about 200, from about 160 to about 200, from about 170 to about 200, from about 170 to about 195, from about 170 to about 190 pounds, etc.

Embodiment 33

The polymer defined in any one of the preceding embodiments, wherein the ethylene polymer is a single reactor product, e.g., not a post-reactor blend of two polymers, for instance, having different molecular weight characteristics.

Embodiment 34

The polymer defined in any one of the preceding embodiments, wherein the ethylene polymer is an ethylene/α-olefin copolymer. Embodiment 35. The polymer defined in any one of the preceding embodiments, wherein the ethylene polymer is an ethylene/1-butene copolymer, an ethylene/1-hexene copolymer, or an ethylene/1-octene copolymer.

Embodiment 36

The polymer defined in any one of the preceding embodiments, wherein the ethylene polymer is an ethylene/1-hexene copolymer. Embodiment 37. The polymer defined in any one of the preceding embodiments, wherein the ethylene polymer is produced using a metallocene-based catalyst system.

Embodiment 38

An article comprising the ethylene polymer defined in any one of the preceding embodiments.

Embodiment 39

An article comprising the ethylene polymer defined in any one of embodiments 1-37, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Embodiment 40

The polymer defined in embodiment 37, wherein the metallocene-based catalyst system comprises catalyst component I comprising any unbridged metallocene compound disclosed herein, catalyst component II comprising any bridged metallocene compound disclosed herein, any activator disclosed herein, and optionally, any co-catalyst disclosed herein.

Embodiment 41

The polymer defined in embodiment 40, wherein catalyst component I comprises an unbridged zirconium or hafnium based metallocene compound containing two cyclopentadienyl groups, two indenyl groups, or a cyclopentadienyl and an indenyl group.

Embodiment 42

The polymer defined in embodiment 40, wherein catalyst component I comprises an unbridged metallocene compound having formula (I):

wherein M is any Group 4 transition metal disclosed herein, $Cp^A$ and $Cp^B$ independently are any cyclopentadienyl or indenyl group disclosed herein, and each X independently is any monoanionic ligand disclosed herein.

Embodiment 43

The polymer defined in any one of embodiments 40-42, wherein catalyst component II comprises a bridged zirconium or hafnium based metallocene compound with a cyclopentadienyl group and a fluorenyl group, and with an alkenyl substituent on the bridging group and/or on the cyclopentadienyl group.

Embodiment 44

The polymer defined in any one of embodiments 40-42, wherein catalyst component II comprises a bridged metallocene compound having formula (II):

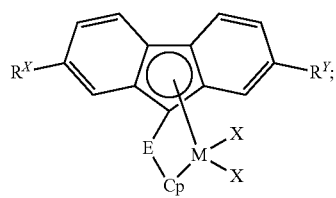

wherein M is any Group 4 transition metal disclosed herein, Cp is any cyclopentadienyl, indenyl, or fluorenyl group disclosed herein, each X independently is any monoanionic ligand disclosed herein, $R^X$ and $R^Y$ independently are any substituent disclosed herein, and E is any bridging group disclosed herein.

Embodiment 45

The polymer defined in any one of embodiments 40-44, wherein the activator comprises an activator-support, an aluminoxane compound, an organoboron or organoborate compound, an ionizing ionic compound, or any combination thereof.

Embodiment 46

The polymer defined in any one of embodiments 40-45, wherein the activator comprises an aluminoxane compound.

Embodiment 47

The polymer defined in any one of embodiments 40-45, wherein the activator comprises an activator-support, the activator-support comprising any solid oxide treated with any electron-withdrawing anion disclosed herein.

Embodiment 48

The polymer defined in embodiment 47, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided-chlorided silica-coated alumina, fluorided silica-coated alumina, fluorided-chlorided silica-coated alumina, sulfated silica-coated alumina, phosphated silica-coated alumina, or any combination thereof.

Embodiment 49

The polymer defined in embodiment 47, wherein the activator-support comprises a fluorided solid oxide and/or a sulfated solid oxide.

Embodiment 50

The polymer defined in any one of embodiments 40-49, wherein the metallocene-based catalyst system comprises a co-catalyst, e.g., any co-catalyst disclosed herein.

Embodiment 51

The polymer defined in embodiment 50, wherein the co-catalyst comprises any organoaluminum compound disclosed herein, e.g., trimethylaluminum, triethylaluminum, triisobutylaluminum, etc.

Embodiment 52

The polymer defined in any one of embodiments 40-51, wherein a weight ratio of catalyst component I to catalyst component II in the catalyst system is in any range disclosed herein, e.g., from about 10:1 to about 1:10, from about 5:1 to about 1:5, from about 2:1 to about 1:2, etc.

Embodiment 53

The polymer or article defined in any one of embodiments 1-52, wherein the ethylene polymer is produced in any polymerization reactor system and under any polymerization conditions disclosed herein.

Embodiment 54

The polymer defined in embodiment 53, wherein the polymerization reactor system comprises a batch reactor, a slurry reactor, a gas-phase reactor, a solution reactor, a high pressure reactor, a tubular reactor, an autoclave reactor, or a combination thereof. Embodiment 55. The polymer defined in embodiment 53, wherein the polymerization reactor system comprises a slurry reactor, a gas-phase reactor, a solution reactor, or a combination thereof.

Embodiment 56

The polymer defined in embodiment 53, wherein the polymerization reactor system comprises a loop slurry reactor.

Embodiment 57

The polymer defined in any one of embodiments 53-56, wherein the polymerization reactor system comprises a single reactor, 2 reactors, or more than 2 reactors.

Embodiment 58

The polymer defined in any one of embodiments 53-57, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 59

The polymer defined in any one of embodiments 53-58, wherein the polymerization conditions are substantially constant, e.g., for a particular polymer grade.

Embodiment 60

The polymer defined in any one of embodiments 53-59, wherein hydrogen is added to the polymerization reactor system.

Embodiment 61

An article of manufacture (e.g., a blow molded article) comprising the ethylene polymer defined in any one of embodiments 1-37 or 40-60.

We claim:

1. An ethylene polymer having a density of greater than or equal to about 0.954 g/cm$^3$, a high load melt index (HLMI) in a range from about 10 to about 45 g/10 min, a ratio of high load melt index to melt index (HLMI/MI) in a range from about 175 to about 600, a slope of a plot of the viscosity (in Pa-sec) versus shear rate (in sec$^{-1}$) of the ethylene polymer at 100 sec$^{-1}$ in a range from about 0.15 to about 0.30, and an environmental stress crack resistance (ESCR, 10% igepal) of greater than or equal to about 800 hours; wherein:
the ethylene polymer comprises a high molecular weight component and a low molecular weight component;
the high molecular weight component has a Mw in a range from about 1,000,000 to about 1,500,000 g/mol, and a ratio of Mw/Mn in a range from about 1.8 to about 2.7; and
the low molecular weight component has a Mw in a range from about 50,000 to about 80,000 g/mol, and a ratio of Mz/Mw in a range from about 1.6 to about 2.5.

2. A blow molded article comprising the ethylene polymer of claim 1.

3. The polymer of claim 1, wherein:
the density is in a range from about 0.954 to about 0.965 g/cm$^3$;
the HLMI is in a range from about 15 to about 40 g/10 min;
the ratio of HLMI/MI is in a range from about 190 to about 550;
the slope of the plot of the viscosity versus shear rate at 100 sec$^{-1}$ is in a range from about 0.15 to about 0.28; and
the ESCR is greater than or equal to about 1000 hours.

4. The polymer of claim 3, wherein the ethylene polymer has a bimodal molecular weight distribution.

5. The polymer of claim 4, wherein the ethylene polymer comprises an ethylene/1-butene copolymer, an ethylene/1-hexene copolymer, or an ethylene/1-octene copolymer.

6. An article comprising the ethylene polymer of claim 5.

7. The polymer of claim 1, wherein:
the density is in a range from about 0.955 to about 0.960 g/cm$^3$;
the HLMI is in a range from about 15 to about 35 g/10 min;
the ratio of HLMI/MI is in a range from about 210 to about 480;
the slope of the plot of the viscosity versus shear rate at 100 sec$^{-1}$ is in a range from about 0.17 to about 0.27; and
the ESCR is greater than or equal to about 1200 hours.

8. An article comprising the ethylene polymer of claim 7.

9. The polymer of claim 1, wherein the ethylene polymer has:
a ratio of Mw/Mn in a range from about 10 to about 22;
a ratio of Mz/Mw in a range from about 5 to about 8;
a Mw in a range from about 200,000 to about 400,000 g/mol; and
a density in a range from about 0.954 to about 0.962 g/cm$^3$.

10. The polymer of claim 9, wherein:
the ethylene polymer has a melt index in a range from about 0.02 to about 0.25 g/10 min; and
the ethylene polymer comprises an ethylene/1-hexene copolymer.

11. The polymer of claim 1, wherein the ethylene polymer has a viscosity at 100 sec$^{-1}$ in a range from about 800 to about 2000 Pa-sec.

12. The polymer of claim 1, wherein the ethylene polymer comprises an ethylene/α-olefin copolymer characterized by:
a density in a range from about 0.9545 to about 0.962 g/cm$^3$; and
a viscosity at 100 sec$^{-1}$ is in a range from about 900 to about 1800 Pa-sec.

13. An article comprising the ethylene/α-olefin copolymer of claim 12.

14. The article of claim 13, wherein the ethylene/α-olefin copolymer has a bimodal molecular weight distribution.

15. The polymer of claim 1, wherein the ethylene polymer has:
a die swell in a range from about 28 to about 43%; and
a bottle topload strength in a range from about 160 to about 200 lb.

16. The polymer of claim 1, wherein the ethylene polymer comprises from about 12 wt. % to about 26 wt. % of the high molecular weight component.

17. An ethylene/α-olefin copolymer having a density in a range from about 0.9545 to about 0.962 g/cm$^3$, a HLMI in a range from about 15 to about 35 g/10 min, a ratio of HLMI/MI in a range from about 200 to about 500, a slope of a plot of the viscosity (in Pa-sec) versus shear rate (in sec$^{-1}$) of the ethylene/α-olefin copolymer at 100 sec$^{-1}$ in a range from about 0.16 to about 0.28, and an ESCR of greater than or equal to about 1100 hours;
wherein the ethylene/α-olefin copolymer is characterized by less than about 0.008 long chain branches per 1000 total carbon atoms, and a number of short chain branches per 1000 total carbon atoms at Mz that is greater than at Mn.

18. The copolymer of claim 17, wherein the ethylene/α-olefin copolymer comprises an ethylene/1-butene copolymer, an ethylene/1-hexene copolymer, or an ethylene/1-octene copolymer.

19. The copolymer of claim 17, wherein the ethylene/α-olefin copolymer has a Mz in a range from about 1,400,000 to about 2,400,000 g/mol.

20. The copolymer of claim 17, wherein the ethylene/α-olefin copolymer has a zero-shear viscosity in a range from about $2 \times 10^5$ to about $1 \times 10^7$ Pa-sec.

21. The copolymer of claim 17, wherein the ethylene/α-olefin copolymer comprises a high molecular weight component and a low molecular weight component, and comprises from about 12 wt. % to about 26 wt. % of the high molecular weight component.

22. The copolymer of claim 17, wherein the ethylene/α-olefin copolymer is produced using a metallocene-based catalyst system, and is a single reactor product.

* * * * *